Figure 1:
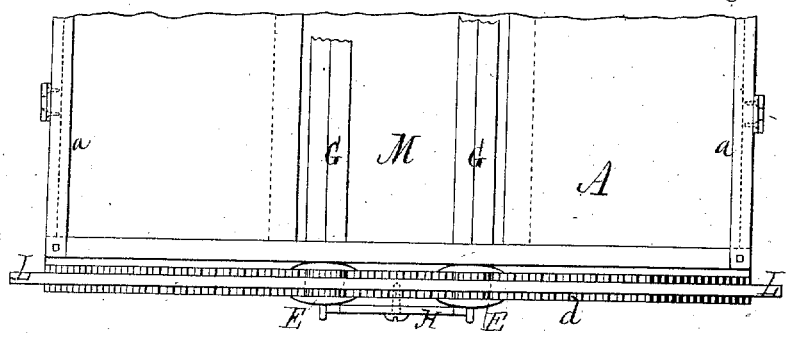
Figure 2:
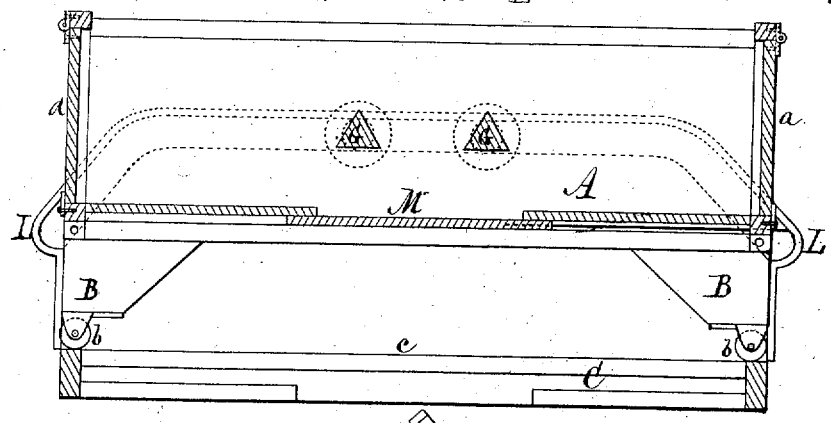
Figure 3:
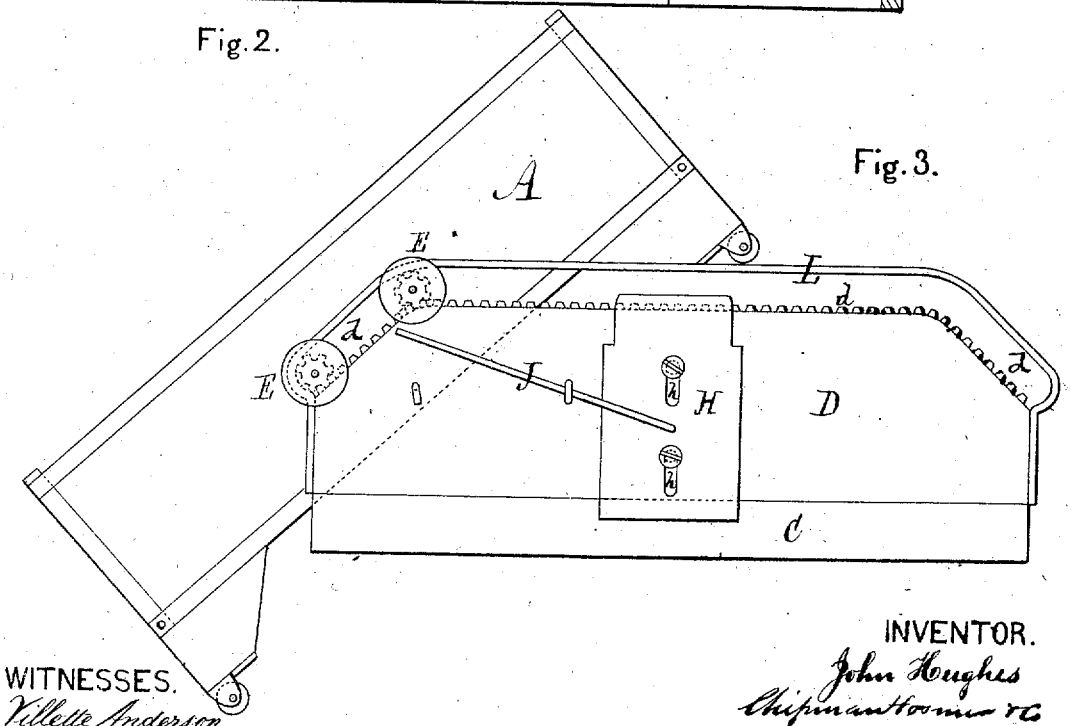

J. HUGHES.
Dumping-Cars.

No. 5,541. Reissued August 19, 1873.

WITNESSES.
Villette Anderson
Emory Bates.

INVENTOR.
John Hughes
Chipman Hooper & Co
attys

UNITED STATES PATENT OFFICE.

JOHN HUGHES, OF NEW BERNE, NORTH CAROLINA.

IMPROVEMENT IN DUMPING-CARS.

Specification forming part of Letters Patent No. 140,779, dated July 15, 1873; reissue No. 5,541, dated August 19, 1873; application filed August 9, 1873.

*To all whom it may concern:*

Be it known that I, JNO. HUGHES, of New Berne, in the county of Craven and State of North Carolina, have invented certain new and useful Improvements in Dumping-Cars; and I do hereby declare that the following is a full, clear, and exact description thereof, that will enable others skilled in the art to which it appertains to make and use the same, reference being had to the accompanying drawings and to the letters of reference marked thereon, which form a part of this specification.

The nature of my invention relates to an improvement in dumping-cars; and it consists, first, in ways formed upon the ends of the truck, upon which the car-body moves transversely, and which have their ends cut away, so as form inclined planes, which allow the body to tilt downward upon either side and discharge its load beyond the track; second, in shields or coverings for the axles, which pass through the body of the car; third, in the construction and arrangement of the brakes, which engage with the pinions and hold the car in position; fourth, in the arrangement and combination of parts which will be more fully described hereafter.

The accompanying drawings represent my invention.

A represents the body of the car, which has a foot, B, at each corner, in which is journaled a roller, *b*, and which steadies and supports the body as it moves back and forth. This body is provided with hinged doors at its side, through which the load may be dumped upon either side of the track, and a sliding door, M, in its bottom, so that the load may be deposited upon the track, whichever may be preferred. The car-truck C D, upon which the body A moves transversely, has a way, *c*, formed upon the inner side of each end, upon which the rollers *b* move, and has the ends of the heads D cut away at an angle of about forty-five degrees. The top edge of the heads, including the inclined ends, form ways *d*, upon which the body A travels, and which is provided with teeth or cogs, in which the toothed wheels E, secured to each end of the axles, engage, so as to move the body from side to side. The axles pass longitudinally through the body above the floor, and are incased in shields or coverings G, which protect them from injury, these casings being either solid bars having their ends attached to the heads D, and the axles running through them, or they may be hollow casings placed around the said axles. When the car is in a level position, resting upon the horizontal part of the way D, it is held stationary by a brake, H, having slots *h*, so that it can be raised upward by means of lever J, so that its upper end will catch between the wheels E and prevent lateral movement, the wheels E being also prevented from vertical displacement by means of the guard L placed over their tops.

Power being applied to either one of the shafts which pass through the body of the car, the body is caused to move along the way, toward either side desired, until the front pulley reaches the inclined plane at the end of the way *d*, when, the pivotal point being passed, the force of gravity causes the body to tilt and automatically dump its load beyond the track on either side.

If so desired, the teeth may be omitted from the ways *d*, and the wheels may be smooth pulleys.

Having described my invention, I claim—

1. The truck C D, having the horizontal way *d*, with ends inclined downward, upon which the rollers travel which support the body, in combination with a guard or other device for holding the body to the truck, substantially as set forth.

2. The car A, having the wheels E secured to each end, in combination with the truck C D, having the ways *d* with inclined ends formed upon its top, and guard L, substantially as shown and described.

3. The casings G, arranged around the axles, substantially as specified.

4. In a dumping-car, the slotted brake H, in combination with the lever J, arranged so as to prevent lateral play of the car, substantially as shown.

In testimony that I claim the foregoing I have hereunto set my hand this 9th day of August, 1873.

JNO. HUGHES.

Witnesses:

F. A. LEHMANN,
W. G. KENDIG.